United States Patent
Wynn et al.

(10) Patent No.: US 8,924,507 B2
(45) Date of Patent: Dec. 30, 2014

(54) CROSS-FRAME PROGRESSIVE SPOILING SUPPORT FOR REDUCED NETWORK BANDWIDTH USAGE

(75) Inventors: Tong L. Wynn, Redmond, WA (US); Vladimir Stoyanov, Redmond, WA (US); Sridhar Sankuratri, Campbell, CA (US); Damien Saint Macary, Sunnyvale, CA (US); Voicu Anton Albu, Bellevue, WA (US); Costin Hagiu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 13/225,022

(22) Filed: Sep. 2, 2011

(65) Prior Publication Data

US 2013/0060886 A1    Mar. 7, 2013

(51) Int. Cl.
*G06F 15/16* (2006.01)
*G06F 15/173* (2006.01)
*H04L 29/08* (2006.01)
*H04L 29/06* (2006.01)

(52) U.S. Cl.
CPC ............... *H04L 67/08* (2013.01); *H04L 67/40* (2013.01)
USPC ........................... 709/217; 709/203; 709/227

(58) Field of Classification Search
USPC .......................................................... 709/217
See application file for complete search history.

(56) References Cited

U.S. PATENT DOCUMENTS

| | | | |
|---|---|---|---|
| 7,657,837 B2 * | 2/2010 | Shappir et al. | 715/751 |
| 7,895,521 B2 * | 2/2011 | Bhogal et al. | 715/740 |
| 8,108,577 B1 * | 1/2012 | Hobbs | 710/72 |
| 8,111,086 B2 * | 2/2012 | Desai | 326/41 |
| 8,120,581 B2 * | 2/2012 | Day et al. | 345/163 |
| 8,166,107 B2 * | 4/2012 | Makhija et al. | 709/203 |
| 8,200,796 B1 * | 6/2012 | Margulis | 709/223 |
| 8,209,430 B2 * | 6/2012 | Barreto et al. | 709/231 |
| 8,225,224 B1 * | 7/2012 | Robertson et al. | 715/767 |
| 8,253,732 B2 * | 8/2012 | Hamill et al. | 345/419 |
| 8,281,040 B2 * | 10/2012 | Hoerl et al. | 710/2 |
| 8,296,357 B2 * | 10/2012 | Stone et al. | 709/203 |
| 8,315,468 B1 * | 11/2012 | Hobbs et al. | 382/232 |
| 8,341,624 B1 * | 12/2012 | Hobbs | 718/1 |
| 8,341,732 B2 * | 12/2012 | Croft et al. | 726/21 |

(Continued)

OTHER PUBLICATIONS

Richardson, T. and Levine, J. "The Remote Framebuffer Protocol," RFC 6143, Mar. 2011.*

(Continued)

*Primary Examiner* — Melvin H Pollack
(74) *Attorney, Agent, or Firm* — Kate Drakos; Micky Minhas

(57) ABSTRACT

An invention is disclosed for efficiently processing and transmitting graphics data in a remote desktop environment. In embodiments of the invention, a connection is established between a remote desktop server computer and a remote desktop client computer. The remote desktop server computer may process graphics data representative of a remote user desktop. The remote desktop server computer may divide the remote desktop screen in data regions and portions. The remote desktop server computer may then encode and transmit each region to the remote desktop client computer at a certain quality that may be adjusted progressively across the screen frames. The remote desktop server computer may also stop encoding and transmitting the portions of the data region that would not be visible to a user when the region is rendered on a display. The remote desktop user experiences an image quality gradually improving with each frame containing information about the image.

20 Claims, 9 Drawing Sheets

(56) References Cited

U.S. PATENT DOCUMENTS

| | | | |
|---|---|---|---|
| 8,392,497 B2 * | 3/2013 | Vilke et al. | 709/202 |
| 8,392,596 B2 * | 3/2013 | Kamay | 709/231 |
| 8,718,400 B2 * | 5/2014 | Rivera | 382/276 |
| 8,780,126 B1 * | 7/2014 | Paquette | 345/545 |
| 2007/0079244 A1 * | 4/2007 | Brugiolo | 715/740 |
| 2007/0220168 A1 | 9/2007 | Parsons et al. | |
| 2008/0198270 A1 | 8/2008 | Hobbs et al. | |
| 2010/0111410 A1 | 5/2010 | Lu et al. | |
| 2010/0162127 A1 * | 6/2010 | Uchino | 715/740 |
| 2010/0226441 A1 | 9/2010 | Tung et al. | |
| 2010/0226548 A1 | 9/2010 | Abdo et al. | |
| 2010/0246982 A1 | 9/2010 | Petrov | |
| 2011/0103465 A1 * | 5/2011 | Chang et al. | 375/240.02 |
| 2011/0141133 A1 | 6/2011 | Sankuratri et al. | |
| 2011/0225542 A1 * | 9/2011 | Schmieder et al. | 715/794 |
| 2011/0314093 A1 * | 12/2011 | Sheu et al. | 709/203 |
| 2012/0036251 A1 * | 2/2012 | Beaty et al. | 709/224 |
| 2012/0151370 A1 * | 6/2012 | Kominac et al. | 715/740 |
| 2012/0192078 A1 * | 7/2012 | Bai et al. | 715/740 |
| 2012/0206452 A1 * | 8/2012 | Geisner et al. | 345/419 |
| 2012/0306912 A1 * | 12/2012 | Blanco et al. | 345/629 |
| 2012/0317295 A1 * | 12/2012 | Baird et al. | 709/228 |
| 2013/0036235 A1 * | 2/2013 | Lopez Garcia et al. | 709/231 |
| 2013/0283181 A1 * | 10/2013 | Mazzaferri | 715/740 |
| 2014/0156756 A1 * | 6/2014 | Ding et al. | 709/204 |

OTHER PUBLICATIONS

Kolesnikov, "Vector Maps Compression for Progressive Transmission", 2nd International Conference on Digital Information Management, Oct. 28-31, 2007, 6 pages.

Polyzos et al., "Hierarchical Coding of Images and Continuous Media for Transmission over Packet-Switching Networks", UCSD Technical Report CS93-273, Jan. 1993, 1-16.

\* cited by examiner

CROSS-FRAME PROGRESSIVE SPOILING SUPPORT FOR REDUCED NETWORK BANDWIDTH USAGE

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e. an execution environment that includes a set of resources. The clients may use remote presentation protocols such as the Remote Desktop Protocol (RDP) to connect to a server resource.

In a remote presentation session, a client sends a server locally-received input, such as mouse cursor movements and keyboard presses. In turn, the server receives this input and performs processing associated with it, such as executing an application in a user session. When the server performs processing that results in an output, such as a graphical output, the server sends this output to the client for presentation. In this manner, applications appear to a user of the client to execute locally on the client when, they in fact, execute on the server.

Further, in the remote presentation session, data representing graphics to be transmitted to the client are typically compressed by the server, transmitted from the server to the client through a network, and decompressed by the client and displayed on the local user display. While there are known techniques for the server to compress and transmit the graphics data to the client through a network, there are also many unresolved problems. For example, problems arise when the network bandwidth constraints the size of the graphics data that can be transmitted to the client, resulting in network latencies and in a negative remote user experience.

Various schemes may be used to minimize the size of the graphics data in a remote presentation session that need to be encoded and transmitted to a remote computing device. Such schemes may include dividing the graphics data into portions, and encoding and transmitting only the portions that have changed since a previous transmission. However, such schemes do not account for and are applied independently of the available network bandwidth and the amount of data to be processed. Thus, such schemes do not optimally resolve the problems of network latencies and their negative impact to the remote user experience.

SUMMARY

In various embodiments, methods and systems are disclosed for optimizing the processing and transmitting of graphics data by performing various progressive encoding and spoiling schemes. When the network bandwidth is limited and/or the amount of data to be processed is large, progressive encoding and spoiling reduces the network bandwidth usage and the frame latency. For example, when using a progressive encoding and spoiling scheme, a graphics data frame is divided into data regions and each data region is encoded and transmitted to the client at a certain quality. The data regions can be further divided between regions containing natural images and regions containing text images. The quality of each data region in a graphics data frame can be progressively improved as the graphics data frame is updated. The quality can also be dynamically adjusted depending on the available network bandwidth and the amount of data to be processed. In addition, to ensure the coherence of the graphics data, a future graphics data frame is processed only after a certain quality of the current graphics data frame is reached. However, when a graphics data frame is updated and a portion of a data region within the graphics data frame would no longer be visible to a remote user when rendered on the user display, that portion is preferably spoiled and is not encoded or transmitted. Furthermore, when the quality of a data region reaches 100%, the data region can be marked as having full fidelity and can be cached by the client computer. Finally, to ensure readability of text images contained in graphics data regions, the progressive encoding and spoiling scheme can be applied to only data regions containing natural images rather than text images. As a result of the progressive encoding and spoiling scheme, the user experiences a natural image quality gradually improving with each frame containing information about the image, while being able to read and understand the text image.

The various progressive encoding and spoiling schemes provide various benefits, depending on the system, including: a reduction in network bandwidth usage with minimal impact to the user experience; a support of multiple progressive and non-progressive codecs in seamlessly encoding different screen portions; a support of progressive encoding on screen regions with natural images in multiple quality levels; a support of data spoiling by not encoding to a higher quality an unneeded data portion; and a dynamic adjustment of progressive encoding and spoiling based on the available network bandwidth and on the amount of data to be encoded.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

Figure 1:
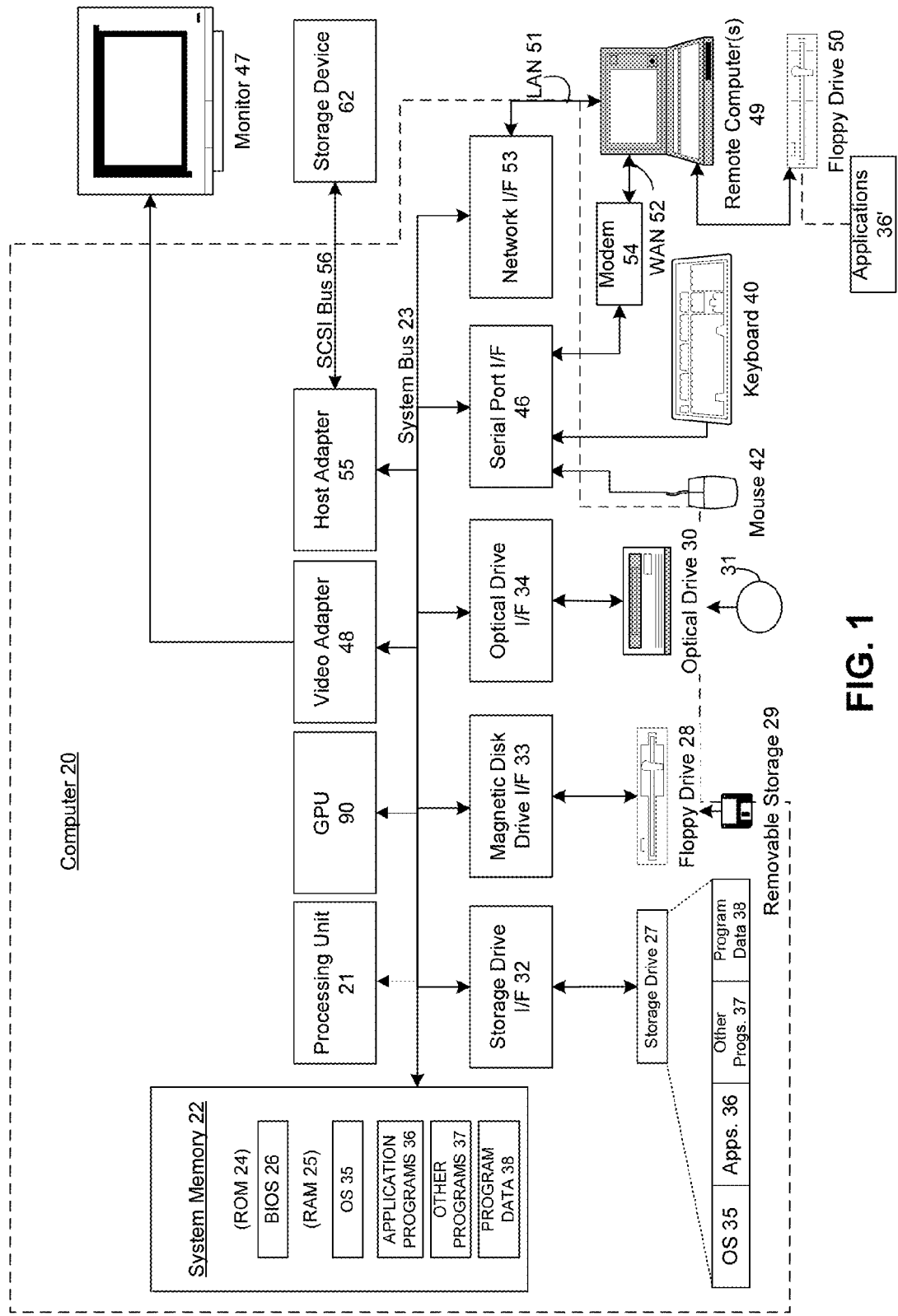
FIG. 1 depicts an example computer system wherein aspects of the present disclosure can be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Embodiments of the invention may execute on one or more computers. FIG. 1 and the following discussion are intended to provide a brief general description of a suitable computing environment in which the disclosure may be implemented. One skilled in the art can appreciate that computer systems can have some or all of the components described herein below.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22 in which at least portions of programming to carry out aspects of the invention may be stored, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive interface 32 or magnetic disk drive interface 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The storage drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure and operable to convert computer 20 into a special purpose computing device. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In embodiments, display 47 may comprise a touch-sensitive surface, to which multi-touch input may be made. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
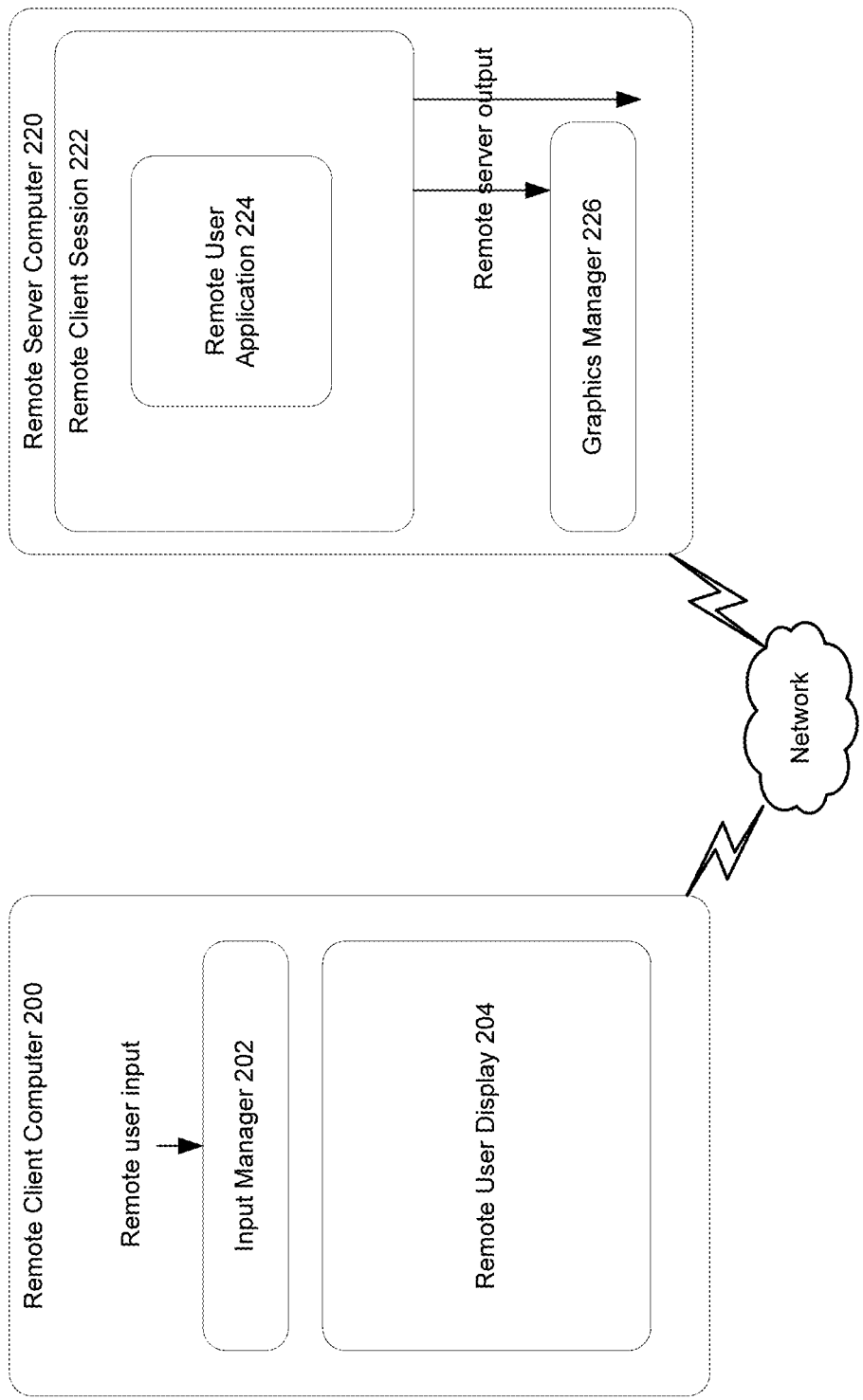
FIG. 2 depicts an example architecture of the input systems of a remote presentation session client and server in which embodiments of the invention may be implemented.

Embodiments of a remote desktop system may execute one or more computers or may have some or all of the components described with respect to computer 20 of FIG. 1. A remote desktop system is a computer system that maintains applications that can be remotely executed by and displayed on client computer systems in a remote presentation session. FIG. 2 depicts an example architecture of a remote desktop system. The remote desktop system can comprise a remote client computer 200 and a remote server computer 220. The remote client computer 200 and the remote server computer 220 are configured to conduct a remote presentation session with each other.

As depicted, the remote server computer 220 serves a remote presentation session to the remote client computer 200 where the remote server computer 220 sends client graphical output from executing user a remote client session 222. A remote user input is entered at the remote client computer 200. An input manager 202 can process and transfer the remote user input over a network (e.g., using protocols based on the International Telecommunications Union (ITU) T.120 family of protocols such as Remote Desktop Protocol (RDP)) to a remote user application 224 on the remote server computer 220. The remote user application 224 can be executed in a remote client session 222 hosted on the remote server computer 220. The remote user application 224 processes the input as if the input were entered at the remote server computer 220. The remote user application 224 generates remote server output in response to the received input and the output is transferred over the network to the remote client computer 200. The remote client computer 200 presents the output data to a remote user. Thus, input is received and output is presented at the remote client computer 200, while processing actually occurs at the remote server computer 220.

In addition to the remote user application 224, the remote client session 222 can include a shell and a user interface such as a desktop, the subsystems that track mouse movement within the desktop, the subsystems that translate a mouse click on an icon into commands that effectuate an instance of a program, other applications, etc. It should be understood that the foregoing discussion is exemplary and that the presently disclosed subject matter may be implemented in various client/server environments and not limited to a particular remote presentation product.

In most, if not all remote desktop environments, the remote user input data (entered at the remote client computer 200) typically includes mouse and keyboard data representing commands to an application. Output data (generated by the remote user application at the remote server computer 220) typically includes graphics data for display at the remote client computer 200. Many remote desktop environments also include functionality that extends to transfer other types of data. In an example embodiment, graphics data output from the user application 224 can be sent to a graphics manager 226 hosted on the remote server computer 220. The graphics manager 226 can compress and transfer the graphics data over the network to a remote user display 204 on the remote client computer 200. The remote user display 204 can render the graphics output data to a remote user.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth. Thus, the available network bandwidth may constrain the data that can be transferred between the remote server computer 220 and the remote client computer 200 and may result in network latencies impacting the remote user experience.

Remote services can be provided to at least one client such as the remote client computer 200. The remote client computer 200 can include a computer terminal that is effectuated by hardware configured to direct user input to a remote client session, such as session 222, and display user interface information generated by the session. In another embodiment, the remote client computer 200 can be effectuated by a computer that includes similar elements as those of computer 20 in FIG. 1. Each connecting client can have a remote client session which allows the client to access data and applications stored on the remote server computer 220. In various embodiments, the remote server computer 220 may be physical hardware. In other embodiments, some or all of the components of the remote server computer 220 may be instantiated as a virtual machine (VM) such as the VM depicted in FIG. 3. In a VM environment, a remote client computer 200 can remotely access the VM and run a remote presentation session.

Figure 3:
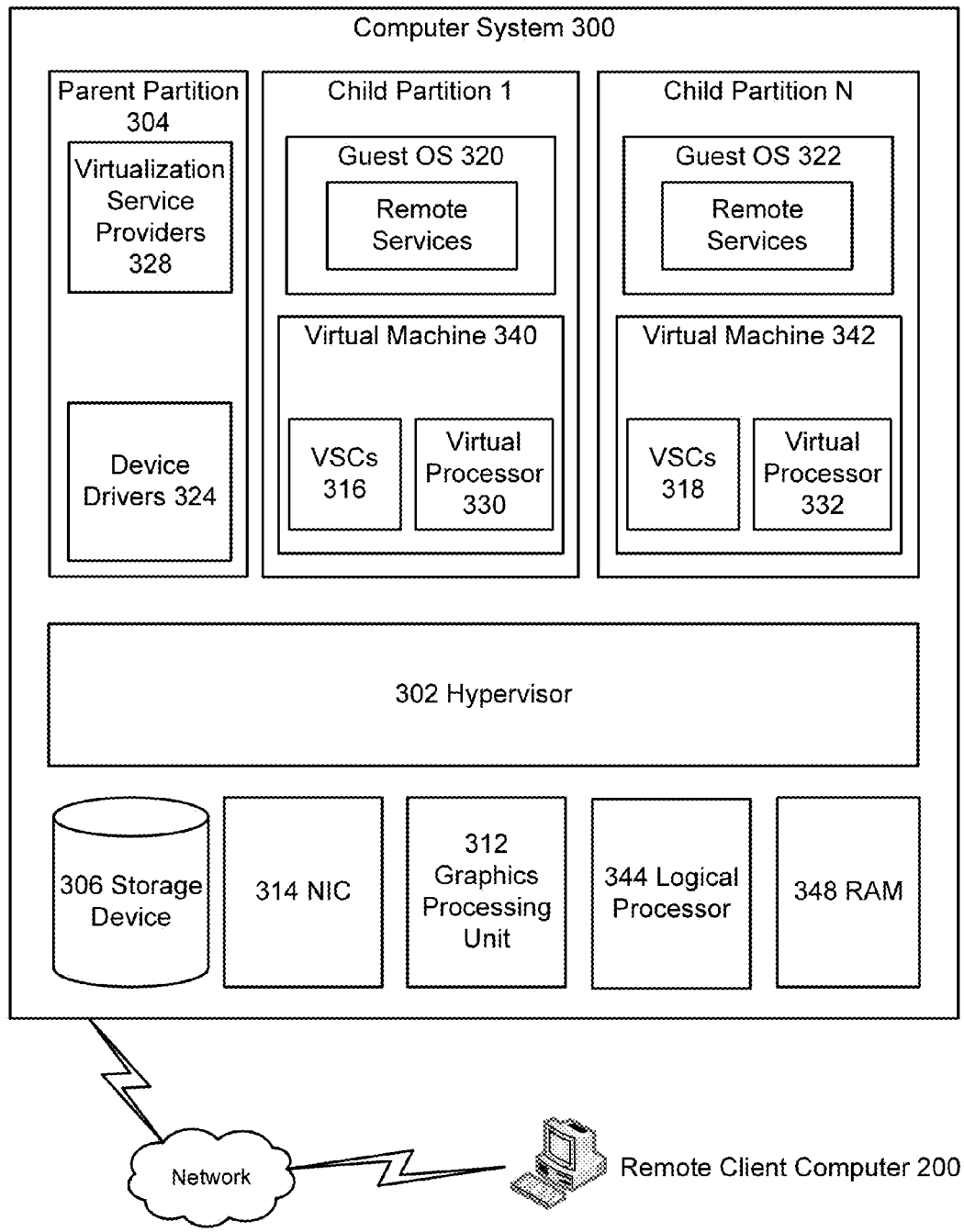
FIG. 3 depicts an operational environment for practicing aspects of the present disclosure.

Referring now to FIG. 3, depicted are high level block diagrams of computer systems configured to effectuate virtual machines. As shown in the figures, computer system 300 can include elements described in FIG. 1 and components operable to effectuate virtual machines. One such component is a hypervisor 302 that may also be referred to in the art as a virtual machine monitor. The hypervisor 302 in the depicted embodiment can be configured to control and arbitrate access to the hardware of computer system 300. Broadly stated, the hypervisor 302 can generate execution environments called partitions such as child partition 1 through child partition N (where N is an integer greater than or equal to 1). In embodiments a child partition can be considered the basic unit of isolation supported by the hypervisor 302, that is, each child partition can be mapped to a set of hardware resources, e.g., memory, devices, logical processor cycles, etc., that is under control of the hypervisor 302 and/or the parent partition and hypervisor 302 can isolate one partition from accessing another partition's resources. In embodiments the hypervisor 302 can be a stand-alone software product, a part of an operating system, embedded within firmware of the motherboard, specialized integrated circuits, or a combination thereof.

In the above example, computer system 300 includes a parent partition 304 that can also be thought of as domain 0 in the open source community. Parent partition 304 can be configured to provide resources to guest operating systems executing in child partitions 1-N by using virtualization service providers 328 (VSPs) that are also known as back-end drivers in the open source community. In this example architecture the parent partition 304 can gate access to the underlying hardware. The VSPs 328 can be used to multiplex the interfaces to the hardware resources by way of virtualization service clients (VSCs) that are also known as front-end drivers in the open source community. Each child partition can include one or more virtual processors such as virtual processors 330 through 332 that guest operating systems 320 through 322 can manage and schedule threads to execute thereon. Generally, the virtual processors 330 through 332 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 340 or 342.

Generally, guest operating systems 320 through 322 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 320 through 322 can have associated file systems that can have applications stored thereon such as terminal servers, e-commerce servers, email servers, etc., and the guest operating systems themselves. The guest operating systems 320-322 can schedule threads to execute on the virtual processors 330-332 and instances of such applications can be effectuated.

Figure 4:
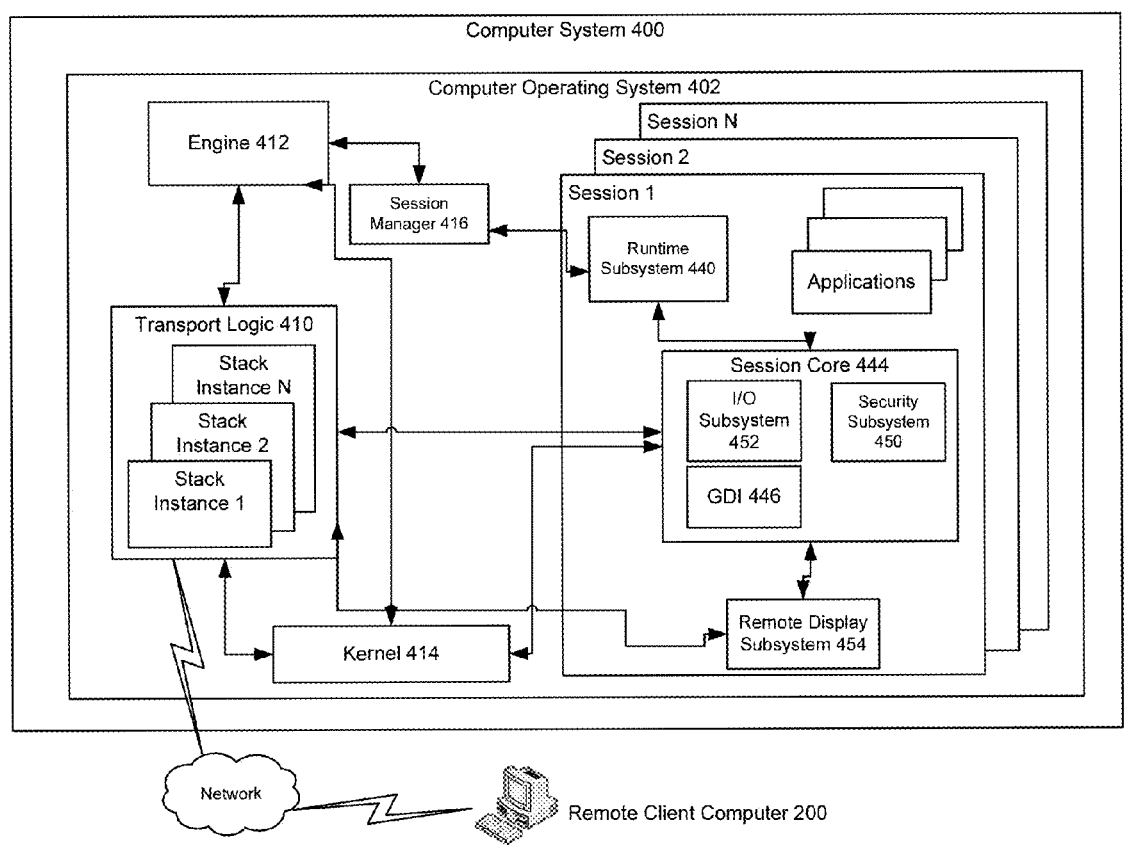
FIG. 4 depicts an example remote presentation session server in which embodiments of the invention may be implemented.

In various embodiments, a remote server computer, such as the remote server computer 220 depicted in FIG. 2, can execute multiple remote client sessions. Each remote client session, such as the remote client session 222, can represent an application environment for a connecting client. In this example embodiment, a remote server computer can generate at least one remote client session for each of the connecting clients as illustrated in FIG. 4. Moreover, as noted above, the remote server computer 220 may be a virtual machine that, in turn, executes multiple remote client sessions.

Depicted in FIG. 4 is computer system 400, which may include circuitry configured to effectuate a remote server computer, or in other embodiments the computer system 400 can include circuitry configured to support remote desktop connections. In the depicted example, the computer system 400 can be configured to generate one or more remote client sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 414 of computer system 400. For example, a session can include a process that instantiates a user interface such as a desktop window, the subsystems that track mouse movement within the window, the subsystems that translate a mouse click on an icon into commands that effectuate an instance of a program, etc. A session can be generated by the computer system 400 on a user by user basis by the computer system 400 when, for example, the computer system 400 receives a connection request over a network connection from a client, such as the remote client computer 200. Generally, a connection request can first be handled by the transport logic 410 that can, for example, be effectuated by circuitry of the computer system 400. The transport logic 410 can in some embodiments include a network adaptor; firmware, and software that can be configured to receive connection messages and forward them to the engine 412. As illustrated by FIG. 4, the transport logic 410 can in some embodiments include protocol stack instances for each session. Generally, each protocol stack instance can be configured to route user interface output to a client and route user input received from the client to the session core 444 associated with its session.

Continuing with the general description of FIG. 4, the engine 412 in some example embodiments of the present invention can be configured to process requests for sessions; determine the functionality for each session; generate sessions by allocating a set of physical resources for the session; and instantiating a protocol stack instance for the session. In some embodiments the engine 412 can be effectuated by specialized circuitry components that can implement some of the above mentioned operational procedures. For example, the circuitry in some example embodiments can include memory and a processor that is configured to execute code that effectuates the engine 412. As depicted by FIG. 4, in some instances the engine 412 can receive connection requests and determine that, for example, a license is available and a session can be generated for the request. In the situation where the computer system 400 is a remote computer that includes remote desktop capabilities, the engine 412 can be configured to generate a session in response to a connection request without checking for a license. As illustrated by FIG. 4, a session manager 416 can be configured to receive a message from an engine 412 and in response to the message the session manager 416 can add a session identifier to a table; assign memory to the session identifier; and generate system environment variables and instances of subsystem processes in memory assigned to the session identifier.

As illustrated by FIG. 4, the session manager 416 can instantiate environment subsystems such as a runtime subsystem 440 that can include a kernel mode part such as the session core 444. For example, the environment subsystems in an embodiment are configured to expose some subset of services to application programs and provide an access point to the kernel of the computer operating system 402. In example embodiments the runtime subsystem 440 can control the execution of processes and threads and the session core 444 can send requests to the executive of the kernel 414 to allocate memory for the threads and schedule time for them to be executed. In an embodiment the session core 444 can include a graphics display interface 446 (GDI), a security subsystem 450, and an input subsystem 452. The input subsystem 452 can in these embodiments be configured to receive user input from a client 401 via the protocol stack instance associated with the session and transmit the input to the session core 444 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 444 and the input subsystem 452 can be configured to determine that an icon is located at the coordinates associated with the double-click. The input subsystem 452 can then be configured to send a notification to the runtime subsystem 440 that can execute a process for the application associated with the icon.

In addition to receiving input from a client 401, draw commands can be received from applications and/or a desktop and be processed by the GDI 446. The GDI 446 in general can include a process that can generate graphical object draw commands. The GDI 446 in this example embodiment can be configured to pass its output to the remote display subsystem 454 where the commands are formatted for the display driver that is attached to the session. In certain example embodiments, one or more physical displays can be attached to the computer system 400, e.g., in a remote desktop situation. In these example embodiments the remote display subsystem 454 can be configured to mirror the draw commands that are rendered by the display driver(s) of the remote computer system and transmit the mirrored information to the client 401 via a stack instance associated with the session. In another example embodiment, where the computer system 400 is a remote presentation session server, the remote display subsystem 454 can be configured to include virtual display driver(s) that may not be associated with displays physically attached to the computer system 400, e.g., the computer system 400 could be running headless. The remote display subsystem 454 in this embodiment can be configured to receive draw commands for one or more virtual displays and transmit them to the client 401 via a stack instance associated with the session. In an embodiment of the present invention, the remote display subsystem 454 can be configured to determine the display resolution for each display driver, e.g., determine the display resolution of the virtual display driver(s) associated with virtual displays or the display resolution of the display drivers associated with physical displays; and route the packets to the client 401 via the associated protocol stack instance.

In some example embodiments, the session manager 416 can additionally instantiate an instance of a logon process associated with the session identifier of the session that can be configured to handle logon and logoff for the session. In these example embodiments drawing commands indicative of the graphical user interface associated with the logon process can be transmitted to the client 401 where a user of the client 401 can input an account identifier, e.g., a username/password combination, a smart card identifier, and/or biometric information into a logon screen. The information can be transmitted to computer system 400 and routed to the engine 412 and the security subsystem 450 of the session core 444. For example, in certain example embodiments the engine 412 can be configured to determine whether the user account is associated with a license; and the security subsystem 450 can be configured to generate a security token for the session.

In a remote desktop environment, the user graphics are rendered at the server for each user. The user graphics can include text images and natural images. The resulting graphics may then be sent to the client for display and interaction. To reduce the bandwidth requirements on the network, graphics may be compressed before transmission to the client. It is desirable that the compression technique be efficient with low latency. The use of progressive encoding and spoiling schemes as will be described herein supports the reduction of bandwidth usage.

Various systems and methods exist for encoding and decoding electronic information, including graphics data. In an exemplary embodiment, an encoding and decoding system may include a dividing module that initially divides a source image into data regions. A frame differencing module may then compare each data region as the data region is updated across the frames and determine whether the region has been updated and if so, what portions of the region have been updated. The frame differencing module can then send the updated and non-updated region to various processing modules that convert the regions into corresponding updated and non-updated data portions. In an embodiment, a quantizer may perform a compression procedure upon the data portions to generate compressed data according to an adjustable quantization parameter. An adaptive entropy selector may then select one of a plurality of available entropy encoders to perform an entropy encoding procedure to thereby produce encoded data. The entropy encoder may also utilize a feedback loop to adjust the quantization parameter in light of current transmission bandwidth characteristics.

In various methods and systems disclosed herein, aspects of the processing and handling of the various processes, such as those described above, may be used to provide more efficient processing and thus a more timely and a richer user experience. The methods and systems also provide such graphics support when the network and/or system resources become congested or otherwise less available. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

Figure 5:
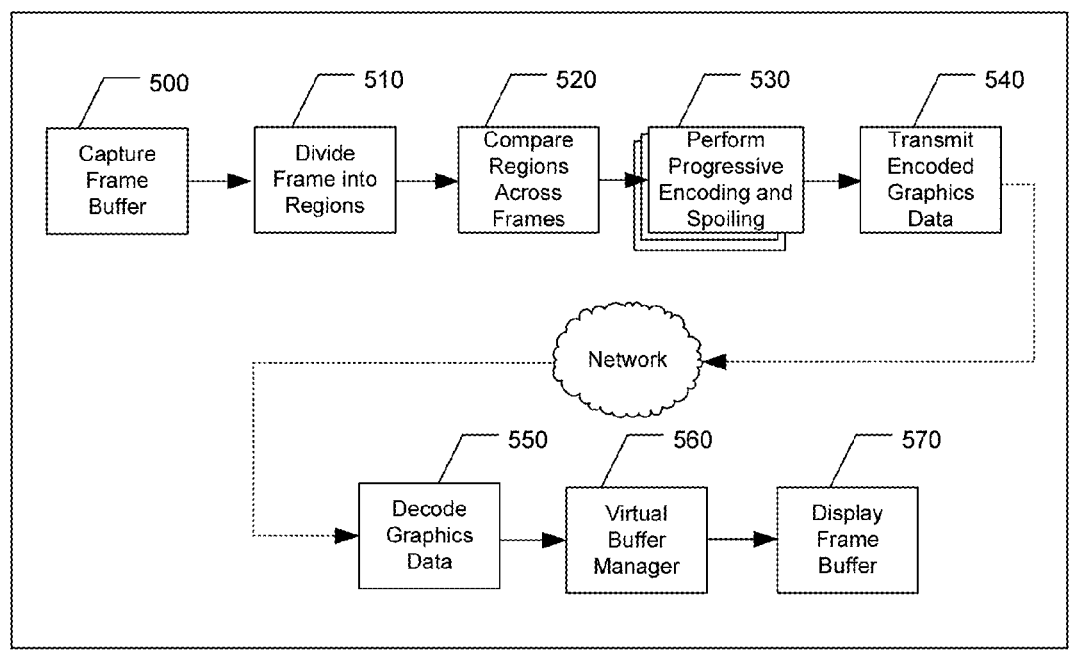
FIG. 5 illustrates an overview of some of the processes disclosed herein.

Referring to FIG. 5, illustrated is an overview of various functions associated with the encoding and transmitting processes discussed herein. Various aspects of the illustrated process may be modified to improve the throughput and efficiency of the processes. Process 500 illustrates the capturing and buffering of a client frame. Process 510 illustrates the dividing of the captured and buffered client frame into data regions. Process 520 illustrates the comparing of the regions to regions in previously captured and buffered client frames. Process 530 illustrates the process of progressive encoding and spoiling of the data regions. Process 540 illustrates the transmitting of the encoded and non-spoiled data regions. Once transmitted, process 550 illustrates that the received frame may be decoded. Process 560 illustrates that the receive buffers may be managed to track changed regions and portions in a frame. Process 570 illustrates that the display frame buffers may be used to drive the display controller in an efficient manner.

Figure 6:
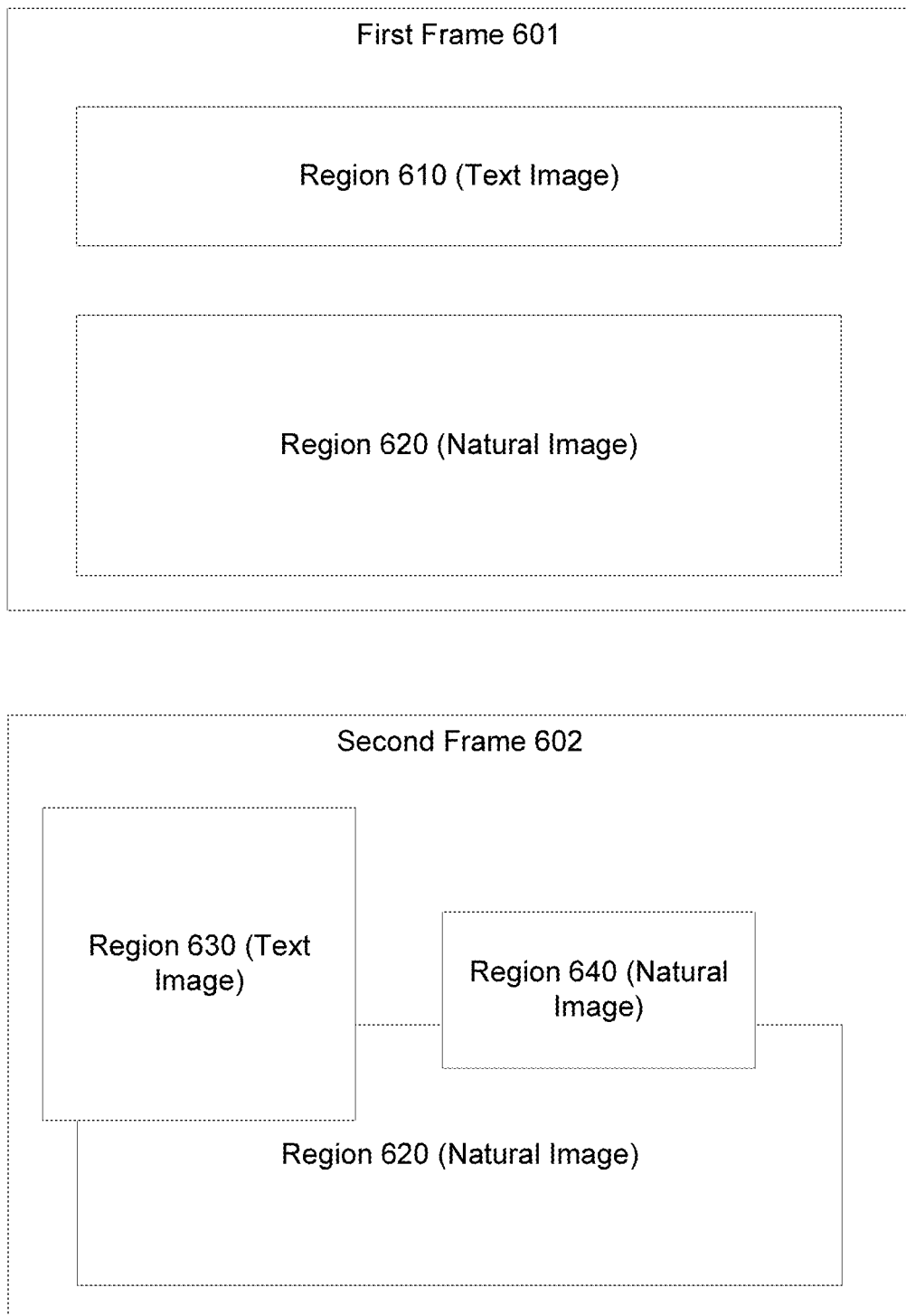
FIGS. 6 and 7 illustrate a remote user screen divided into data regions and portions for compression.
Figure 7:
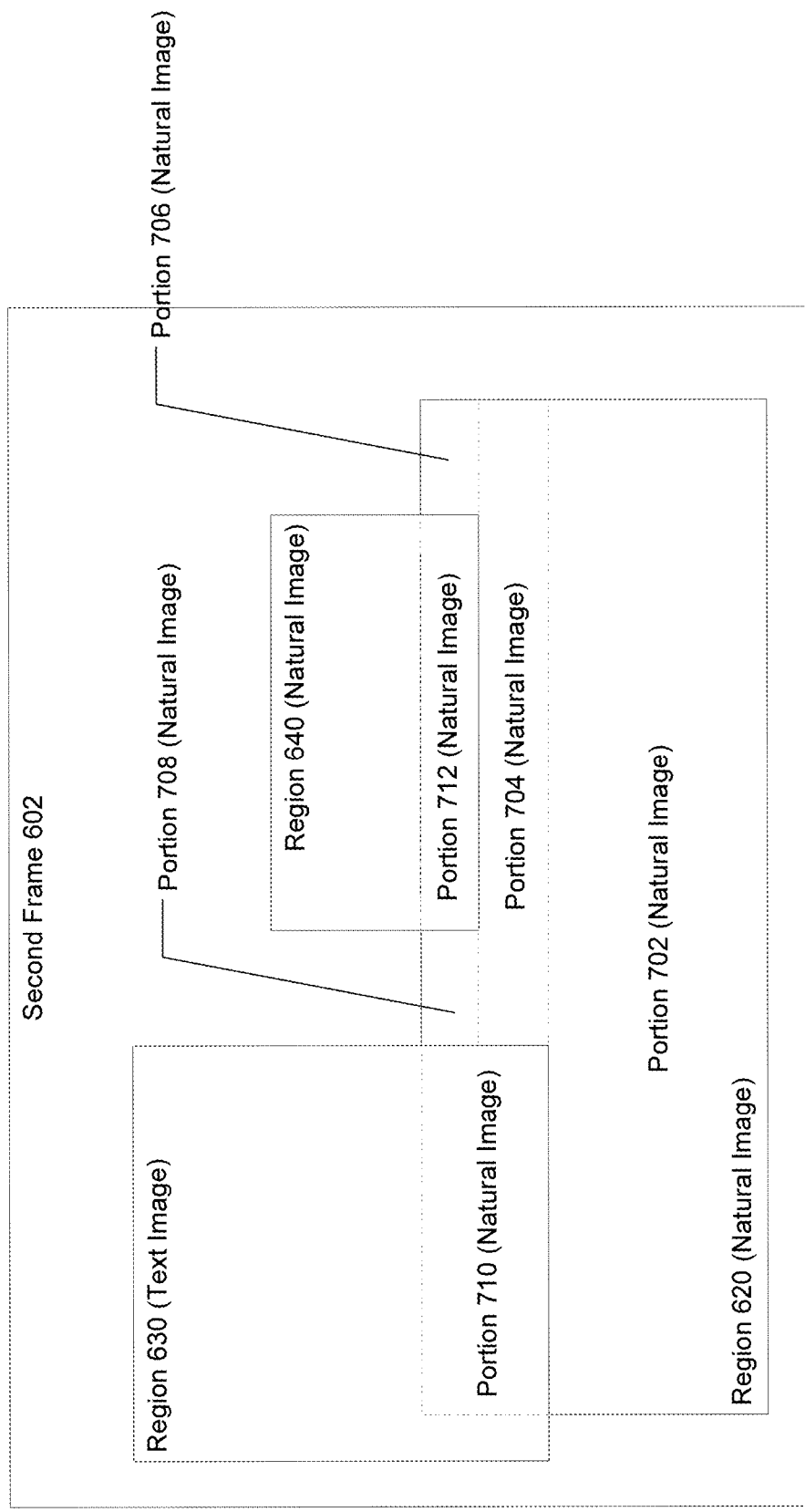

Various embodiments may incorporate a progressive encoding and spoiling scheme that the server uses to encode and transmit a portion of a screen to the client. FIGS. 6 and 7 provide an example of a screen region that the server needs to encode and transmit to the client. Various means, such as a screen scraping function in Remote Desktop Protocol (RDP), can be used to allow the server to read graphics data representative of specific regions or portions thereof on the screen and to determine which regions or portions are changing. Whenever a region or a portion of a region changes, RDP drivers may provide the coordinates of the region or the portion thereof that is changing. FIG. 6 depicts an example of a screen with a first frame 601 and a second frame 602, the second frame 602 being an adjacent update of the first frame 601. In this example, the first frame 601 contains region 610 and region 620. Region 610 contains text image content while region 620 contains natural image content. The server encodes and transmits the first frame 601 to the client for display and interaction. Afterwards, the server encodes and transmits the second frame 602 to the client for display and interaction. In this second encoding and transmitting step, the region 610 in the first frame 601 should not be processed a second time because the region 610 is no longer rendered in the second frame 602. In comparison, region 630 and region 640 are new regions in the second frame 602 and need to be encoded and transmitted to the client for the first time. In addition, the region 620 is the same region 620 encoded and transmitted in the first frame 601 and needs to be processed a second time because the region 620 is also rendered in the second frame 602. However, the region 620 in the second frame 602 contains portions that are occluded by the region 630 and the region 640 and portions that are non-occluded by any other graphics object.

FIG. 7 further exemplifies the occluded and non-occluded portions of the region 620 depicted in FIG. 6. Portion 702, portion 704, portion 706, and portion 708 are non-occluded portions of the region 620 because they are not blocked by other graphics objects (e.g. the region 630 and the region 640). As such, the non-occluded portions (e.g. portions 702, 704, 706, and 708) when rendered on a display would be visible to a user. On the other hand, portion 710 is occluded by the region 630 in the second frame 602. Similarly, portion 712 is occluded by the region 640 in the second frame 602. The occluded portions (e.g. portions 710 and 712) when rendered on a display would not be visible to a user because of other blocking graphics objects (e.g. regions 630 and 640). To reduce bandwidth usage and the amount of data to be processed, the server needs to only encode and transmit data representative of the non-occluded portions (e.g. portions 702, 704, 706, and 708) of region 620 in the second frame 602. The occluded portions (e.g. portions 710 and 712) can be said to be spoiled. Data representative of spoiled regions or portions need not be encoded, transmitted, or further processed by the server. Because the amount of data to be encoded and transmitted is reduced, the spoiling of the occluded portions will result in a reduction in the network bandwidth usage, which will in-turn result in a reduction in network latencies and will improve the remote user experience.

To further optimize the bandwidth usage and the amount of data to be processed, various embodiments may incorporate a progressive encoding and transmitting scheme. The server can determine an overall quality for the remote presentation session. The quality can be used by an encoder within the server to encode the data to the client. For example, a 100% quality can represent the maximum quality the encoder can encode the data and can equate to the overall quality of the remote presentation session. In one embodiment, the server can encode and transmit data representative of a region in a first frame at a first quality. For example, the server can encode and transmit the region 620 in the first frame 601 at, say, a 50% quality. The server can subsequently encode and transmit data representative of the same region in a second frame at a second quality. For example, the server can encode and transmit the region 620 in the second frame 602 at, say, a 75% quality.

In one embodiment, the server can progressively improve the quality used to encode and transmit the graphics data to the client. For example, the second quality at which the server is encoding and transmitting the data can be higher than the first quality at which the server already encoded and transmitted the data. The remote user will experience a graphics image display that is gradually improving with each new frame containing information about the image.

In a further embodiment, the second quality at which the server encodes and transmits the data can be set as an increment over the first quality. The increment over the first quality can be a pre-determined percentage or can be dynamically adjusted based on various factors such the available network bandwidth and the amount of data to be processed. For example, and referring to FIG. 6, the region 620 in the first frame 601 can be encoded and transmitted at a first quality of 50%. The sever can then determine that an increment of 25% is needed when encoding and transmitting the region 620 in the second frame 602. Therefore, the server can encode and transmit the region 620 in the second frame 602 at a second quality of 75%. In parallel, because the region 640 in the second frame 602 has not been previously processed, the server can encode and transmit the region 640 at the first quality of 50%. As such, different regions and portions in the same graphics frame can be encoded and transmitted at different quality levels.

In one embodiment, the quality that the server uses to encode and transmit the graphics data can be dynamically adjusted as a function of the available network bandwidth and/or the amount of data to be processed. For example, after the server encodes and transmits the first frame, the server could detect the available network bandwidth and the amount of data to be processed. The server could then determine a target quality to be used in processing the second frame. This dynamic quality adjustment ensures that a high quality is used with the available network bandwidth and/or amount of data to be processed. For example, when the server determines that sufficient network bandwidth exists, the server can encode and transmit the graphics data at a 100% quality.

In one embodiment, to ensure readability of text content in a region or in a portion of a region, the server may not apply the progressive encoding and spoiling scheme to the graphics data comprising a text image contained in the region or in the portion of the region. Alternatively, the server can apply a progressive encoding and spoiling scheme with a 100% quality for the text image region or portion and can apply a different quality for the natural image regions and portions. For example, the region 610 in the first frame 601 depicted in FIG. 6 has text image content, while region 620 has natural image content. The server encoding and transmitting the first frame 601 can encode and transmit the region 610 at a 100% quality, and the region 620 at a different quality (e.g. 50%). Similarly, the server can encode and transmit the text image region 630 in the second frame 602 at a 100% quality, and the natural image regions 620 and 640 at different quality levels (e.g. 75% for the region 620 and 50% for the region 640).

In an embodiment, when the quality of the encoded and transmitted region is a 100%, the region can be marked as having full fidelity. The region can then be used by other components in the RDP such as components associated with data caching, delta detection, and motion detection. As such, the full fidelity region need not be encoded and transmitted again if the full fidelity region re-appears in a future frame. Thus, implementing a full fidelity marking further reduces the bandwidth usage by reducing the amount of data to be processed.

In order to reduce network latencies and improve the remote user experience when the available network bandwidth and/or the amount of data to be processed impose constraints on the encoding and transmitting schemes, an embodiment can use a combination of progressive encoding and spoiling techniques. For progressive encoding, the embodiment uses a higher quality (e.g. 100%) for text image regions, a lower quality (e.g. 50%) for natural image regions that are encoded and transmitted for the first time, and a quality increment (e.g. 25%) over the last quality for subsequent encoding and transmitting of the natural image regions. In addition, spoiled regions or portions thereof are not encoded and transmitted. As an example and referring to FIGS. 6 and 7, the following quality levels are applied:

100% for the text image region 610 in the first frame 601 and the text image region 630 in the second frame 602. Because of the 100% quality, the region 610 and the region 630 are marked as full fidelity regions.

50% for the region 620 in the first frame 601 and for the region 640 in the second frame 602 because both regions contain natural image content and are processed for the first time in the respective frames.

75% for the region 620 in the second frame 602 because the natural region 620 was previously processed in the first frame 601. In addition, the region 620 contains occluded and non-occluded portions. Only the non-occluded portions 702, 704, 706, and 708 are encoded and transmitted to the client at the 75% quality, while the occluded portions 710 and 712 are spoiled and not encoded and transmitted.

The amount of processing associated with encoding regions at incremental qualities and spoiling portions thereof as needed, and the network bandwidth usage associated with transmitting these regions are reduced in comparison to a non-progressive encoding and transmitting scheme. In other words, the amount of data associated with encoding a region can be reduced with each frame where the region re-appears because the region is encoded at incremental qualities across the frames and portions thereof are spoiled as necessary.

In various embodiments, an encoding context can be created for a data region that appear for the first time in a frame. In this encoding context, a first quality is set as a target quality. Subsequently, the encoding context is updated when the region appears in a second frame, and/or when occluded portions of the region no longer need to be encoded and transmitted. The target quality in the encoding context is also updated and is set as an increment over the first quality. Referring to regions and portions in FIGS. 6 and 7, the following pseudo code for the encoding context of the natural image regions can be used:

The natural image region 620 in the first frame 601:
pContext1=CreateEncodingContext(Region 620)
pEncoder→Encode(pContext1, {Region 620}, nTargetQuality (e.g. 50%), &pbBuffer1, cbBufefr1)

The natural region 620 and the natural image region 640 in the second frame 602:
pContext2=CreateEncodingContext(Region 640)
pEncoder→Encode(pContext2, {Region 640}, nTargetQuality(e.g. 50%), &pbBuffer2, cbBuffer2)
pEncoder→Encode(pContext1, {portion 702, portion 704, portion 706, portion 708}, nTargetQuality(e.g. 75%), &pbBuffer3, cbBuffer3)

In an embodiment, in order to ensure the coherence of the frame displayed by the client to the remote user, the client may not display a second decoded graphics frame until all the regions in the first graphics frame have been decoded and displayed at the quality levels associated with the progressive encoding and spoiling of the first frame.

In an embodiment, an entropy encoder function may perform an entropy encoding procedure to generate encoded graphics data. In certain embodiments, the entropy encoding procedure further reduces the bit rate of the encoded graphics data by substituting appropriate codes for corresponding bit patterns in the encoded graphics data. In one embodiment, a GPU may be provided graphics data with data regions and/or non-occluded data portions that need to be encoded. In this manner, the process effectively implements a progressive encoding and spoiling scheme in concert with the client where the resulting decoded graphics data is maintained and displayed. As such, the server can perform the entropy encoding on the most needed data portions at a certain quality and thus reduces latencies from the encoding process.

Figure 8:
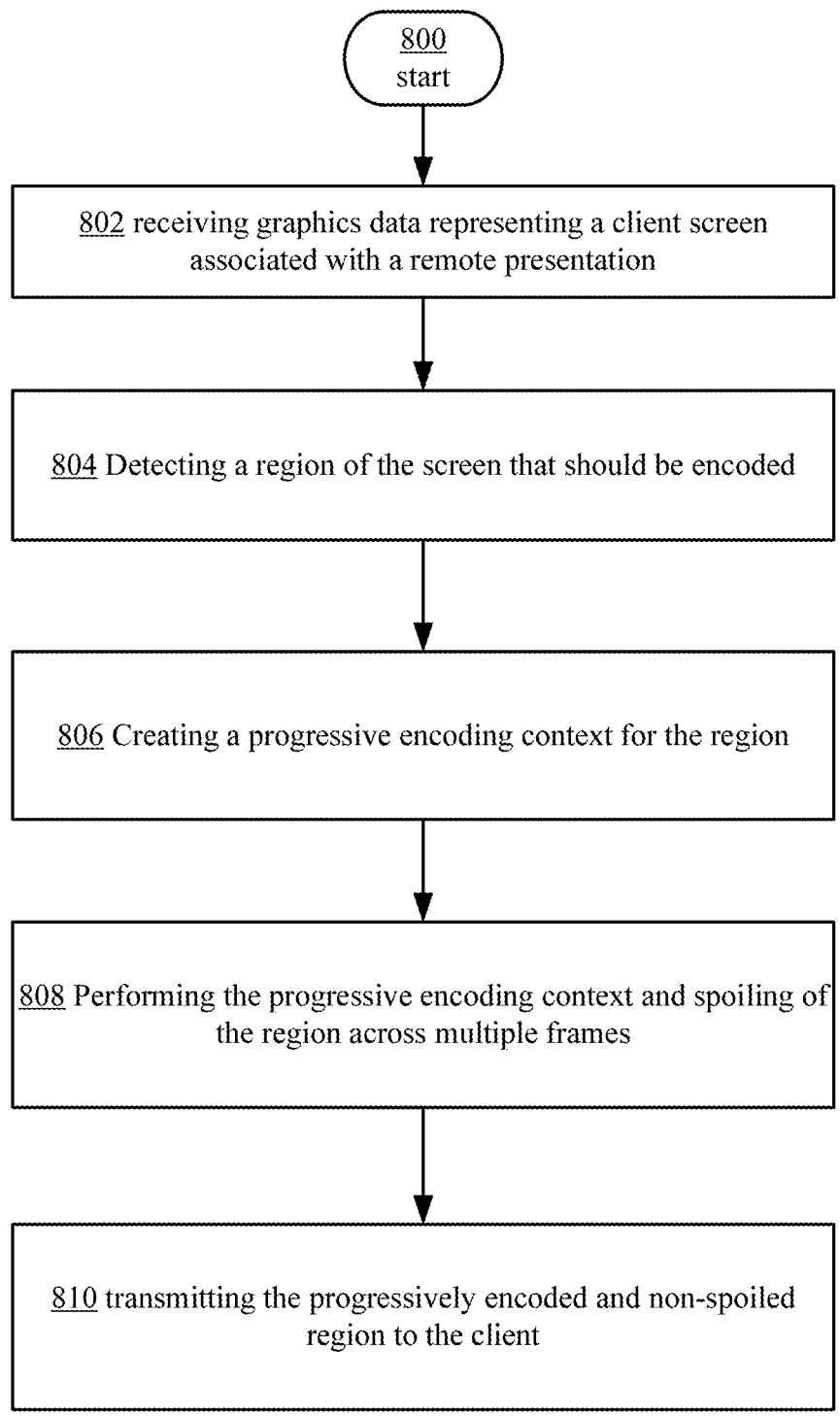
FIG. 8 illustrates an example of an operational procedure for processing graphics data for transmission to a client computer.

FIG. 8 depicts an exemplary operational procedure for processing graphics data for transmission to a client including operations 800, 802, 804, 806, 808, and 810. Operation 800 begins the operational procedure and operation 802 illustrates receiving graphics data representing a client screen associated with a remote presentation. Operation 804 illustrates detecting which regions of the client screen need to be processed with a progressive encoding and spoiling scheme. Operation 806 illustrates creating a progressive encoding context for each of the regions to be processed with a progressive encoding and spoiling scheme. Operation 808 illustrates performing the progressive encoding context and spoiling of a region across multiple graphics frames for each of the created encoding context. Operation 810 illustrates transmitting the progressively encoded and non-spoiled region to the client.

Figure 9:
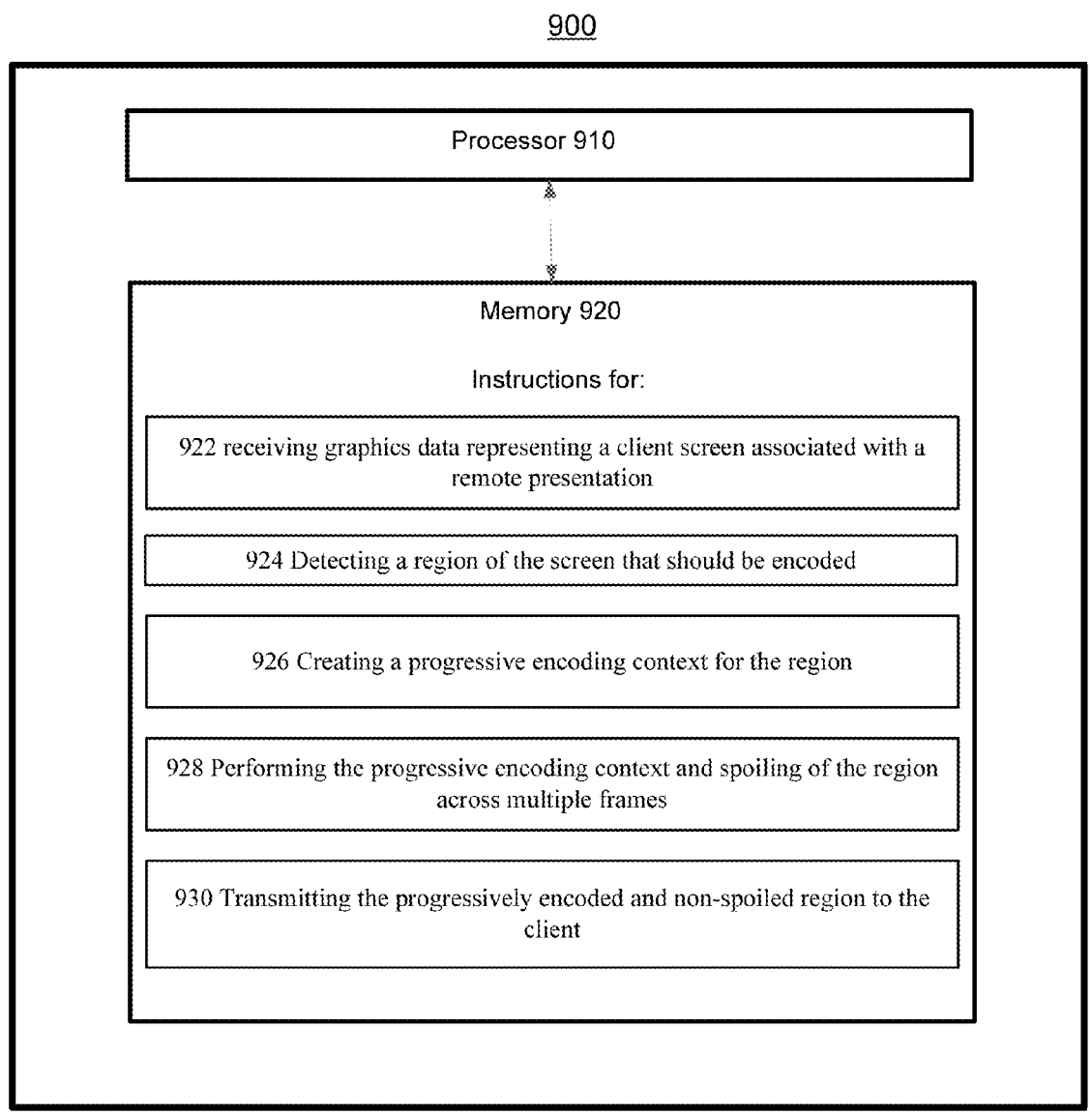
FIG. 9 illustrates an example system and computer-readable medium for processing graphics data for transmission to a client computer.

FIG. 9 depicts an exemplary system for processing graphics data for transmission to a client computer as described above. System 900 comprises a processor 910 and memory 920. In an embodiment, the processor 910 can be implemented as processing unit 21 in FIG. 1, while the memory 920 can be implemented as having some or all of the components of the system memory 22 in FIG. 1. The memory 920 further comprises computer instructions configured to cause the system to process graphics data for transmission to a plurality of client computers. Block 922 illustrates receiving graphics data representing a client screen associated with a remote presentation. Block 924 illustrates detecting which regions of the client screen need to be processed with a progressive encoding and spoiling scheme. Block 926 illustrates creating a progressive encoding context for each of the regions to be processed with a progressive encoding and spoiling scheme. Block 928 illustrates performing the progressive encoding context and spoiling of a region across multiple graphics frames for each of the created encoding context. Block 930 illustrates transmitting the progressively encoded and non-spoiled region to the client.

Any of the above mentioned aspects can be implemented in methods, systems, computer-readable media, or any type of manufacture.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A system for encoding and transmitting graphics data in a remote desktop environment, comprising:
   a processor; and
   a memory communicatively coupled to the processor, the memory bearing processor instructions that, when executed by the processor, cause the system to:
   process a first region of a user remote desktop;
   determine a first data set representative of a portion of a first region;
   transmit the first data set to a remote desktop client computer at a first quality;
   process a second region of the user remote desktop, the second region including at least one previously processed sub-region and at least one not previously processed sub-region;
   determine a second data set representative of a non-occluded portion of the second region, the non-occluded portion being a portion of the region that is visible when rendered on a display; and
   transmit the second data set to the remote desktop client computer, wherein a portion of the second data set including the at least one previously processed sub-region is transmitted at a second quality and a portion of the second data set including the at least one not previously processed sub-region is transmitted at the first quality.

2. The system of claim 1, wherein the second quality is higher than the first quality.

3. The system of claim 1, wherein the second quality is a fixed minimal increment over the first quality.

4. The system of claim 1, wherein the second quality is near or at a maximum quality.

5. The system of claim 1, wherein the second quality is a function of network bandwidth connecting the remote desktop server computer with the remote desktop client computer and other computing devices.

6. The system of claim 1, wherein the second quality is a function of an amount of data to be processed.

7. The system of claim 1, wherein the second quality is a function of network bandwidth connecting the remote desktop server computer with the remote desktop client computer and other computing devices and an amount of data to be processed.

8. The system of claim 1, wherein the second quality is near or at a maximum quality for a data set representative of a portion of a region that is a text image.

9. The system of claim 1, wherein a data set representative of an occluded portion of a region is not sent to the remote desktop client computer, the occluded portion being a portion of the region that is not visible when rendered on a display.

10. The system of claim 1, wherein a data set representative of a non-occluded portion is cached when a first quality or a second quality of the data set is 100%.

11. A method for encoding and transmitting graphics data in a remote desktop environment, comprising:
  processing a first region of a user remote desktop;
  determining a first data set representative of a portion of a first region;
  transmitting the first data set to a remote desktop client computer at a first quality;
  processing a second region of the user remote desktop, the second region including at least one previously processed sub-region and at least one not previously processed sub-region;
  determining a second data set representative of a non-occluded portion of the second region, the non-occluded portion being a portion of the region that is visible when rendered on a display; and
  transmitting the second data set to the remote desktop client computer, wherein a portion of the second data set including the at least one previously processed sub-region is transmitted at a second quality and a portion of the second data set including the at least one not previously processed sub-region is transmitted at the first quality.

12. The method of claim 11, wherein the second quality is higher than the first quality.

13. The method of claim 11, wherein the second quality is a function of network bandwidth connecting the remote desktop server computer with the remote desktop client computer and other computing devices and an amount of data to be processed.

14. The method of claim 11, wherein the second quality is near or at a maximum quality for a data set representative of a portion of a region that is a text image.

15. The method of claim 11, wherein a data set representative of an occluded portion of a region is not sent to the remote desktop client computer, the occluded portion being a portion of the region that is not visible when rendered on a display.

16. A computer-readable storage device for encoding and transmitting graphics data in a remote desktop environment, bearing computer-readable instructions that, when executed on a computer, cause the computer to perform operations comprising:
  processing a first region of a user remote desktop;
  determining a first data set representative of a portion of the first region;
  transmitting the first data set to a remote desktop client computer at a first quality;
  processing a second region of the user remote desktop, the second region including at least one previously processed sub-region and at least one not previously processed sub-region;
  determining a second data set representative of a non-occluded portion of the second region, the non-occluded portion being a portion of the region that is visible when rendered on a display; and
  transmitting the second data set to the remote desktop client computer, wherein a portion of the second data set including the at least one previously processed sub-region is transmitted at a second quality and a portion of the second data set including the at least one not previously processed sub-region is transmitted at the first quality.

17. The computer-readable storage device of claim 16, wherein the second quality is higher than the first quality.

18. The computer-readable storage device of claim 16, wherein the second quality is a function of network bandwidth connecting the remote desktop server computer with the remote desktop client computer and other computing devices and an amount of data to be processed.

19. The computer-readable storage device of claim 16, wherein the second quality is near or at a maximum quality for a data set representative of a portion of a region that is a text image.

20. The computer-readable storage device of claim 16, wherein a data set representative of an occluded portion of a region is not sent to the remote desktop client computer, the occluded portion being a portion of the region that is not visible when rendered on a display.

* * * * *